US008788974B2

(12) United States Patent
Perl et al.

(10) Patent No.: US 8,788,974 B2
(45) Date of Patent: Jul. 22, 2014

(54) NEIGHBORHOOD AUDITING TOOL AND USER INTERFACE

(75) Inventors: Yehoshua Perl, Forest Hills, NY (US); James Geller, West Orange, NJ (US)

(73) Assignee: New Jersey Institute of Technology, University Heights Newark, NJ (US)

( * ) Notice: Subject to any disclaimer, the term of this patent is extended or adjusted under 35 U.S.C. 154(b) by 576 days.

(21) Appl. No.: 12/490,293

(22) Filed: Jun. 23, 2009

(65) Prior Publication Data

US 2010/0077342 A1 Mar. 25, 2010

Related U.S. Application Data

(60) Provisional application No. 61/080,728, filed on Jul. 15, 2008.

(51) Int. Cl.
*G06F 3/048* (2013.01)
(52) U.S. Cl.
USPC ............ 715/853; 715/781; 715/792; 715/835; 715/854; 715/855
(58) Field of Classification Search
USPC .......... 707/100; 715/762–763, 853–855, 781, 715/792, 835
See application file for complete search history.

(56) References Cited

U.S. PATENT DOCUMENTS

| 2001/0043238 | A1* | 11/2001 | Guerrero | 345/853 |
|---|---|---|---|---|
| 2005/0192926 | A1* | 9/2005 | Liu et al. | 707/1 |
| 2006/0053135 | A1* | 3/2006 | Beaumont et al. | 707/101 |
| 2009/0222769 | A1* | 9/2009 | Sloo | 715/854 |

OTHER PUBLICATIONS

Morrey, P. et al., "The Neighborhood Auditing Tool—A Hybrid Interface for Auditing the UMLS," Journal of Biomedical Informatics, Jun. 2009, vol. 42, Issue 3, pp. 468-489.
Aristotle, "Metaphysics" Available at: http://www.greektexts.com/library/Aristotle/Metaphysics/eng/277.html, Accessed May 31, 2013, 1 page.
Bodenreider, O., "An object-oriented model for representing semantic locality in the UMLS," Stud Health Technol Inform, 2001, vol. 84, Part 1, pp. 161-165.
Bodenreider, O., "Circular hierarchical relationships in the UMLS: etiology, diagnosis, treatment, complications and prevention," Proc AMIA Symp, 2001, pp. 57-61.
Bodenreider, O., "The Unified Medical Language System (UMLS): integrating biomedical terminology," Nucleic Acids Res., Jan. 2004, vol. 32, pp. D267-D270.
Bresell, A. et al., "Ontology annotation treebrowser: an interactive tool where the complementarity of medical subject headings and gene ontology improves the interpretation of gene lists," Appl Bioinformatics, 2006, vol. 5, Issue 4, pp. 225-236.

(Continued)

*Primary Examiner* — Amy Ng
*Assistant Examiner* — Claudia Dragoescu
(74) *Attorney, Agent, or Firm* — Moritt Hock & Hamroff LLP; Steven S. Rubin, Esq.

(57) ABSTRACT

Techniques are described that generally relate to systems, methods, and devices designed to facilitate the auditing of ontologies. Example methods may be designed so that the neighborhood concepts for a selected focus concept may be automatically displayed in a hybrid display that efficiently uses display area, while the concepts may be generally presented in an easy-to-comprehend format.

19 Claims, 9 Drawing Sheets

(56) References Cited

OTHER PUBLICATIONS

Campbell, K.E. et al., "The Unified Medical Language System: toward a collaborative approach for solving terminologic problems," J Am Med Inform Assoc, Jan.-Feb. 1998, vol. 5, Issue 1, pp. 12-16.

Chen, Y. et al., "Structural group auditing of a UMLS semantic type's extent," J Biomed Inform, Feb. 2009, vol. 42, Issue 1, pp. 41-52.

Chen, Y. et al., "Analysis of a study of the users, uses, and future agenda of the UMLS," J Am Med Inform Assoc, Mar./Apr. 2007, vol. 14, Issue 2, pp. 221-231.

Cimino, J.J., "Auditing the Unified Medical Language System with semantic methods," Jan.-Feb. 1998, vol. 5, Issue 1, pp. 41-51.

Cimino, J.J, "Battling Scylla and Charybdis: the search for redundancy and ambiguity in the 2001 UMLS metathesaurus," Proc AMIA Symp, 2001, pp. 120-124.

Cimino, J.J., "Terminology tools: state of the art and practical lessons," Methods Inf Med., 2001, vol. 40, Issue 4, pp. 298-306.

Cimino, J.J. et al., "Consistency across the hierarchies of the UMLS Semantic Network and Metathesaurus," J Biomed Inform, Dec. 2003, vol. 36, Issue 6, pp. 450-461.

Cimino, J.J. and Zhu, X., "The practical impact of ontologies on biomedical informatics," Year Med Inform, 2006, pp. 124-135.

Friedman, C. et al., "A vocabulary development and visualization tool based on natural language processing and the mining of textual patient reports.," J. Biomed Inform., Jun. 2003, vol. 36, Issue 3, pp. 189-201.

Fung, K.W. et al., "Who is using the UMLS and how—insights from the UMLS user annual reports," AMIA Annu Symp Proc. 2006, pp. 274-278.

Geller, J. et al., "Semantic refinement and error correction in large terminological knowledge bases," Data & Knowledge Engineering, Apr. 2003, vol. 45, Issue 1, pp. 1-32.

Gu, H.H. et al., "Evaluation of a UMLS Auditing Process of Semantic Type Assignments," AMIA Annu Symp Proc., 2007, pp. 294-298.

Gu, H. et al., "Auditing concept categorizations in the UMLS," Artif Intell Med, May 2004, vol. 31, Issue. 1, pp. 29-44.

Gu, H. et al., "Representing the UMLS as an object-oriented database: modeling issues and advantages," J Am Med Inform Assoc, Jan.-Feb. 2000, vol. 7, No. 1, pp. 66-80.

Hole, W.T and Srinivasan, S., "Discovering missed synonymy in a large concept-oriented Metathesaurus," Proc AMIA Symp, 2000, pp. 354-358.

Humphreys, B.L. et al., "The Unified Medical Language System: an informatics research collaboration," J. Am Med Inform Assoc, Jan.-Feb. 1998, vol. 5, No. 1, pp. 1-11.

Lindberg, D.A. et al., "The Unified Medical Language System," Methods of Information in Medicine, 1993, vol. 32, pp. 281-291.

Lomax, J. and McCray, A.T., "Mapping the gene ontology into the unified medical language system," Comp Funct Genomics, 2004, vol. 5, No. 4, pp. 354-361.

Zhang, L. et al., "An Enriched Unified Medical Language System Semantic Network with a Multiple Subsumption Hierarchy," J Am Med Inform Assoc., May-Jun. 2004, vol. 11, No. 3, pp. 195-206.

McCray, A.T., "An Upper-Level Ontology for the Biomedical Domain," Comp Funct Genomics, Feb. 2003, vol. 4, No. 1, pp. 80-84.

McCray, A.T and Hole, W.T., "The scope and structure of the first version of the UMLS Semantic Network," In Proc. Fourteenth Annual SCAMC, Nov. 1990, pp. 126-130.

McCray, A.T. and Nelson, S.J., "The representation of meaning in the UMLS," Methods Inf Med., Mar. 1995, vol. 34, No. 1-2, pp. 193-201.

Min, H. et al., "Auditing as Part of the Terminology Design Life Cycle," J Am Med Inform Assoc, 2006, vol. 13, No. 6, pp. 676-690.

Mougin, F. and Bodenreider, O., "Approaches to Eliminating Cycles in the UMLS Metathesaurus: Naïve vs. Formal," AMIA Annu Symp Proc. 2005, pp. 550-554.

NASA Software Quality Assurance. Available at: http://web.archive.org/web/20071227194632/http://satc.gsfc.nasa.gov/assure/assurepage.html, Accessed May 31, 2013, 1 page.

Peng, Y. et al., "Auditing the UMLS for redundant classifications," Proc. AMIA Symp, 2002, pp. 612-616.

Perl, Y. et al., "The cohesive metaschema: a higher-level abstraction of the UMLS Semantic Network," J. Biomed Inform, Jun. 2002, vol. 35, No. 3, pp. 194-212.

Protege Homepage. Available at: http://protege.stanford.edu/, Accessed May 31, 2013, 1 page.

Rosse, C. and Mejino, J.L. Jr., "A reference ontology for biomedical informatics: the Foundational Model of Anatomy," J Biomed Inform, Dec. 2003, vol. 36, No. 6, pp. 478-500.

Kremer, S.S. et al., "Revising the UMLS Semantic Network," In M. Fieschi, E. Coiera, and e. Y. C. Li YC, editors, Proc Medinfo 2004, 5 pages, San Francisco, CA.

Schuyler, P.L. et al., "The UMLS Metathesaurus: representing different views of biomedical concepts," Bull Med Libr Assoc., Apr. 1993. vol. 81, No. 2, pp. 217-222.

Tao, Y. et al., "A "Systematics" Tool for Medical Terminologies," AMIA Annu Symp Proc., 2003, 1 page.

Tuttle, M.S. et al., "Using META-1, the first version of the UMLS Metathesaurus," In Proceedings of Fourteenth Annual SCAMC, 1990, pp. 131-135.

Zhang, L. et al., "Relationship structures and semantic type assignments of the UMLS Enriched Semantic Network," J Am Med Inform Assoc., Nov.-Dec. 2005, vol. 12, No. 6, pp. 657-666.

\* cited by examiner

900 Computer Program Product

902 Computer-Readable Medium

904 Computer-Executable Instructions selecting a focus concept in the ontology as a currently selected focus concept;

identifying one or more concepts in the ontology that are at least one level of hierarchy higher than the currently selected focus concept as higher concepts, at least one level of hierarchy lower than the currently selected focus concept as lower concepts, or laterally associated with the currently selected focus concept as lateral relationships' target concepts;

defining a first window region, a second window region, a third window region, and a fourth window region of the display image;

generating content in the first defined window region to include the currently selected focus concept;

selectively generating content in the second defined window region for lower concepts when identified;

selectively generating content in the third defined window region for higher concepts when identified;

selectively generating content the fourth defined window region for lateral relationships' target concepts when identified; and rendering the display image such that the first, second, third, and fourth defined window regions are concurrently rendered in the display image.

| 906 | 908 |
|---|---|
| Recordable Medium | Communications Medium |

*Fig. 9*

NEIGHBORHOOD AUDITING TOOL AND USER INTERFACE

STATEMENT OF RELATED APPLICATION

This application claims the benefit of U.S. Provisional Patent Application No. 61/080,728 entitled, "A User Interface Design for a Semantic Network," which was filed on Jul. 15, 2008 and which is hereby incorporated by reference in its entirety for all purposes.

BACKGROUND INFORMATION

Modern computer systems attempt to represent human knowledge by using structured information in the form of semantic networks, terminologies, and ontologies. The human knowledge is represented using a structure that represents the "concepts" of the human knowledge and the connections between those concepts. This kind of knowledge can be conceptually structured as a mathematical graph. The "backbone" of this graph is hierarchically structured using a Directed Acyclic Graph (DAG) of concepts and "IS-A" links. An IS-A link may demonstrate that concept "B" is a kind of a (parent) concept "A." The DAG can be augmented by lateral relationships between concepts and by local information about the concepts.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through the use of the accompanying drawings. In the drawings:

FIG. 9 is a diagram generally illustrating a computer product configured to perform processing for the neighborhood auditing system shown in FIG. 1, all arranged in accordance with at least some embodiments of the present disclosure.

DETAILED DESCRIPTION OF ILLUSTRATIVE EMBODIMENTS

Figure 1:
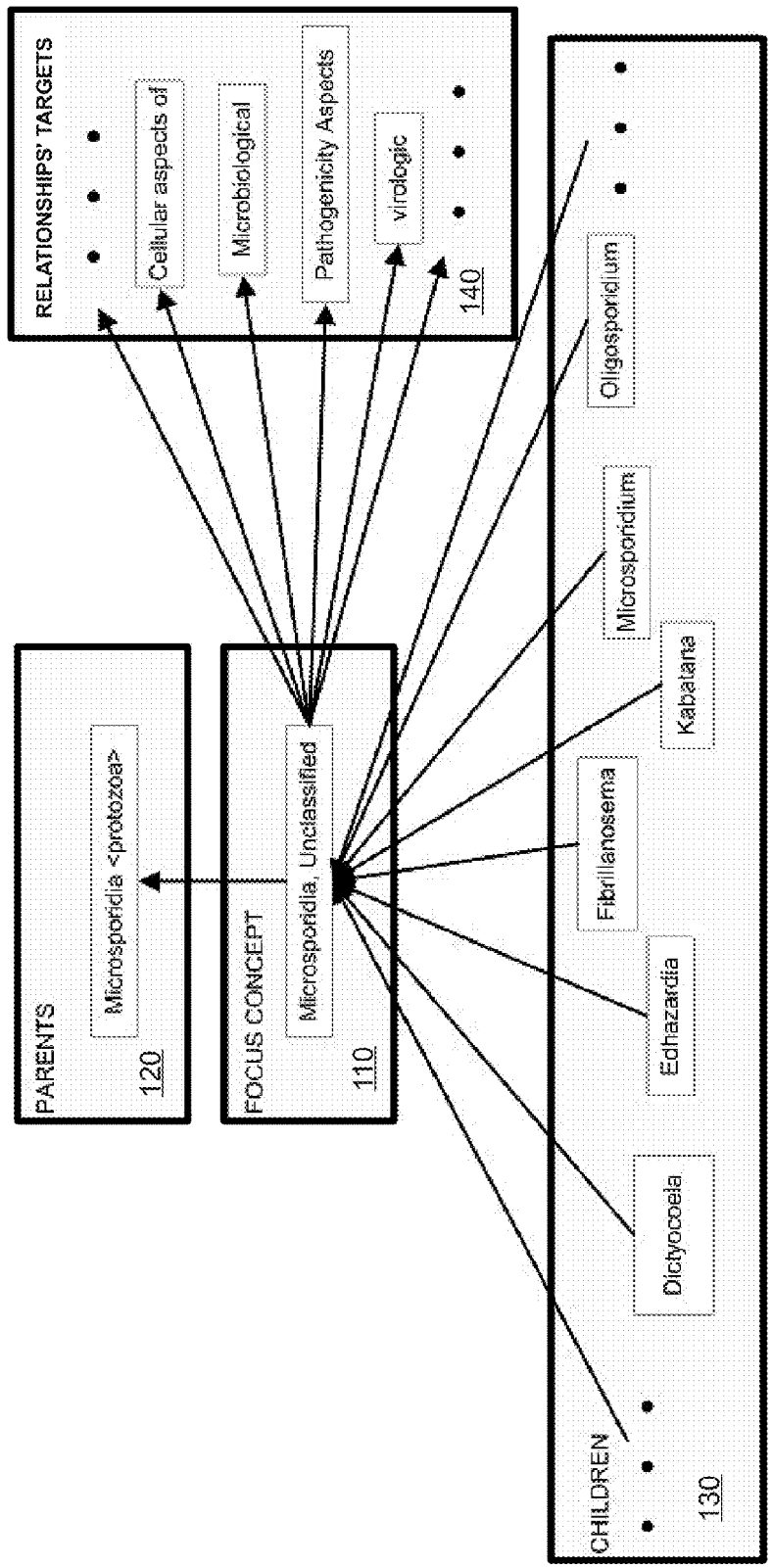
FIG. 1 is a functional block diagram illustrating an example neighborhood of a focus concept.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to selecting, processing, auditing, and/or displaying knowledge graph information that may be selectively focused on a neighborhood of the knowledge graph relative to a focus concept. Certain embodiments of one such system are illustrated in the figures and described below. Many other embodiments are also possible, however, time and space limitations prevent including an exhaustive list of those embodiments in one document. Accordingly, other embodiments within the scope of the claims will become apparent to those skilled in the art from the teachings of this disclosure.

The Unified Medical Language System (UMLS) is an important resource for the medical informatics community. Currently, the UMLS is derived from over 100 source vocabularies, having a Metathesaurus (META) and a Semantic Network (SN). The META is a database of concepts and terms from the various source vocabularies (and their relationships), and currently houses more than 1.5 million concepts. The SN includes the set of categories and relationships that are used to classify and relate the entries in the META. The SN provides an abstraction layer that includes high-level, broad categories that are called semantic types. One or more semantic types are assigned to each of the concepts of the semantic network concepts. As discussed further below, this dual knowledge arrangement supports the ongoing integration (e.g., construction) editing (e.g., maintenance) activities, and auditing (e.g., correcting errors).

Auditing is an important part of the terminology design life-cycle of a semantic network (SN). An example purpose of auditing a terminology may be to detect errors in the stored knowledge of the UMLS. The stored knowledge may be factually wrong (for example, as in having a wrong target concept for a lateral relationship or having a misleading definition). Other kinds of errors may express contradictory situations (such as when a cycle of hierarchical relationships occurs or when a concept appears as a child of another concept when according to its definition it should be its parent or a sibling). Furthermore, two concepts in the META may be duplicates or one concept may be ambiguous. An audit report may list potential errors and suggest possible ways to resolve the errors. Such audits can work well enough when auditing a tightly controlled source vocabulary.

However, the UMLS was not designed as a terminology but as a terminological system that integrates many source vocabularies to enable electronic access to their knowledge and interoperability among them. Thus, logical inconsistencies are expected in the UMLS, and many cannot be resolved. These many inconsistencies cannot be resolved due to the commitment, in the UMLS design, to represent each source in its entirety, independently of the content of other sources. Nevertheless, some kinds of inconsistencies in the UMLS can be resolved by editors while auditing the UMLS.

An auditing tool is disclosed herein that may facilitate the process of auditing the UMLS. In some embodiments, a Neighborhood Auditing Tool (NAT) is described that presents an auditor with a variety of neighborhood view options, at both the concept level and the semantic-type level. Because many inconsistencies may be discovered locally, and especially in the context of exploring closely related concepts, such as parents and children, the described tools may be based on the neighborhoods of a concept upon which the auditor (e.g., a user) is presently focusing.

The NAT may be capable of displaying a variety of neighborhoods of a focus concept by using a hybrid combination of text windows and diagrammatic designs. The use of a focus concept may ease a user's mental effort because when the user is studying network diagrams, the users' thinking may typically be focusing the user's concentration upon one specific concept, and how it relates to the rest of the knowledge graph. Thus, the focus concept may be aligned with how the user naturally views the structure being represented.

FIG. 1 is a functional block diagram illustrating an example neighborhood of a focus concept in accordance with the present disclosure. Upon need, the user can shift the focus concept 110 to one of the neighboring focus concepts (such as parents concept 120, children concept 130, and relationships' target concepts 140). Neighboring concepts can be defined using four kinds of neighborhoods: immediate neighborhood, extended neighborhood, up-extended neighborhood, and down-extended neighborhood. Because all information in a DAG structure is related in some form to a focus concept, family generation terms can be used to describe neighboring concepts (such as parents, children, siblings, grandparents, and the like). Thus, the immediate neighborhood of a concept may include parents, children, and other knowledge items that may be reached in a single step (as disclosed herein) from the focus concept.

A distinguishing feature of an example hybrid display is that the display may combine features of scrolled text (and/or ideographic, for example) window displays with features of a graph diagram, which may result in a synergistic display. The NAT may use text formatting features to convey neighborhood information for a focus concept. The neighborhood information may include displaying relational concepts such as parents (e.g., parent concepts) and grandparents (e.g., grandparent concepts) of the focus concept in a scrollable text window.

Figure 2:
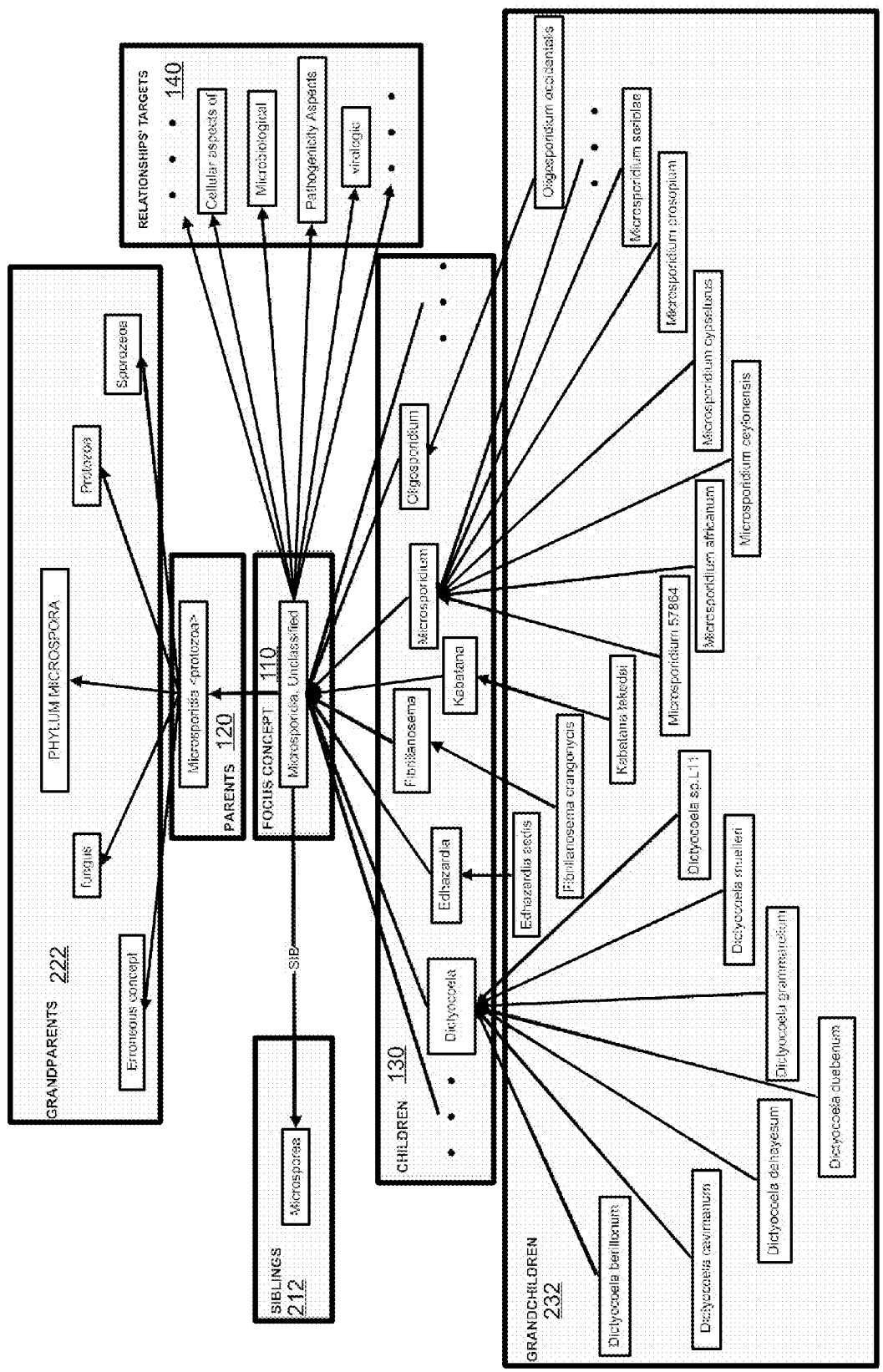
FIG. 2 is a functional block diagram illustrating an example extended neighborhood of the focus concept introduced in conjunction with FIG. 1.

FIG. 2 is a functional block diagram illustrating an extended neighborhood of the focus concept introduced in conjunction with FIG. 1. The extended neighborhood may include additional relational concepts such as grandparents 222, siblings 212, and grandchildren 232. The display of various relational concepts (such as the grandparents concepts, sibling concepts, and/or grandchildren concepts) may be turned on (i.e. activated) or turned off (i.e. deactivated) selectively.

The major building blocks of the META may be described as concepts and relationships. The META may include many different source vocabularies. If available in the source vocabularies, definitions for a concept may be provided. The UMLS may also identify the source vocabularies from which each concept may be taken. Relationships may be divided into hierarchical and lateral relationships. A hierarchical relationship supports the organization of the concepts in a network where family references, such as parent, ancestor, child, and sibling, may be defined. UMLS terminology may refer to directional hierarchical relationships as "parent-of" or "child-of" in accordance with the direction of the relationship.

Structurally, a terminology hierarchy may be represented using, for example, a directed acyclic graph (DAG). Using a DAG may ensure that no path exists in the graph to return to the starting point when following the parent arrows in the network. However, as discussed above, hierarchical relationship cycles may exist in the META. This phenomenon may result due to the cumulative impact of inconsistent hierarchical relationships from various loosely controlled sources.

Lateral relationships may be less tightly controlled than hierarchical relationships in the META. Some lateral relationships may be named as in their sources (such as SNOMED, NCI Thesaurus, and FMA). The lateral relationships that are unnamed in the sources may be given general designations. These lateral relationships may include "broader" (RB) or "narrower" (RN) types of relationships. Other lateral relationships may be marked with a "catch all" relationship designated "other" (or RO, for short).

The UMLS is unique among medical terminological systems in that it has an interconnected two-level structure. The upper level, includes the Semantic Network (SN), which may include numerous (for example, 135) semantic types. The semantic types may be broad biomedical categories associated with concepts. Semantic types may be hierarchically connected via IS-A links and organized as two trees. Numerous (for example, 53) kinds of lateral relationships have been defined for the SN, which may hold "between pairs" of semantic types. Thus, the SN may be structurally similar to the META (although the META and SN may contain different data and may be used for different purposes). When integrating a new source into the UMLS, the editors may assign each new concept one or more semantic types to support the integration process. As discussed in greater detail below, the SN may also be used to support auditing techniques for the UMLS.

The UMLS avoids imposing restrictions on the content, structure, and semantics of the source vocabularies. However, flexibility may increases the danger of introducing inconsistencies into the META. As a result, the policy of retaining all knowledge given in each source—even though the knowledge of one source may contradict knowledge of another source—effectively guarantees some inconsistencies. Examples of possible inconsistencies include omissions, non-uniform classifications, mis-classifications, ambiguities, redundant classifications, and synonyms listed independently as separate concepts. Some of these inconsistencies are very likely to be visible to UMLS end users. Because the UMLS underlies, for example, decision-support systems, clinical patient records, health care administrative systems, and the like, the inconsistencies may cause problems in the systems that rely upon the UMLS.

While all inconsistencies in the UMLS may not be resolved (at least without imposing restrictions on the source vocabularies), some knowledge in the UMLS may be under the direct control of UMLS editors. The identification of a term from a source with a UMLS concept may be specified by the UMLS editors in the integration process. The semantic types assigned to concepts during the integration process are artifacts of the UMLS and are not usually derived from the source vocabularies. The designation of relationships as "parent," "broader," or any other kind of relationship designation is typically decided by the UMLS editors according to predefined rules. Some concepts (or their related terms) and some of their relationships may be added by the editors. Such additions may be labeled with "MTH" to indicate their source.

When auditing the UMLS, an auditor may concentrate on inconsistencies arising with the knowledge elements under the control of the UMLS editors and are thus modifiable by them. Examples of resolving the inconsistencies may include a concept assigned two semantic types that are mutually exclusive, or one of the semantic types having an IS-A relationship to the other. Having one of the semantic types having an IS-A relationship to the other is a case of a redundant semantic type assignment, which may be forbidden in the UMLS. A UMLS auditing report may identify inconsistencies regarding knowledge elements labeled with MTH (or inconsistencies that can be resolved by adding, deleting, or modifying MTH knowledge elements and other knowledge elements controlled by the UMLS editors).

The NAT may present information about the concept to an auditor in the form of a set of different neighborhoods of the focus concept. When auditing a biomedical concept for example, it may not be sufficient to merely look at the concept itself to determine whether it is correct. Rather, the close neighborhood of the concept should likewise be investigated. An example auditing scenario may include giving an auditor a concept that may be considered to be inconsistent. To assess the concept for potential inconsistencies, the auditor may view details of the concept. The auditor may start with a "small" environment, such as the close neighborhood of a concept, to avoid a possible mental "overload" of the auditor. If the presented neighborhood does not provide enough information, the auditor may transition to a larger neighborhood.

As disclosed herein, four different kinds of neighborhoods for an auditing context are introduced: immediate neighborhood, extended neighborhood, up-extended neighborhood, and down-extended neighborhood. For each kind of neighborhood, there exists a corresponding neighborhood at the SN level that may include the corresponding semantic types (STs) assigned to the neighborhood's concepts. The auditor may start with one identified concept as the focus concept (having potential inconsistencies), and in the process of auditing, may navigate to other close-by concepts. The elements of the neighborhoods thus may include the potential future focus concept in the navigation process. Accordingly, the structure of neighborhoods may be used to support navigation of the META.

The knowledge associated with a focus concept may include two kinds of knowledge elements: textual knowledge elements and contextual knowledge elements. Textual knowledge elements of a concept may include the name of the concept, a concept unique identifier (CUIs) for the concept, the terms and the lexical unique identifiers (LUIs) for the concept, and definitions, source terminologies, and/or the semantic type(s) assigned to the concept. Several definitions may come from different (relatively uncontrolled) sources and thus may be inconsistent.

Contextual knowledge elements are other concepts that may provide context for the focus concept. Adjacent concepts of the focus concept (such as parents, children, siblings, and those related to the concept through lateral relationships) may define major contextual knowledge elements of a concept. While the contextual knowledge elements are concepts in their own right, the contextual knowledge elements may provide knowledge that plays an important role in expressing the meaning of a concept. Determining the meaning of a concept may be difficult because many UMLS concepts are highly technical and specialized so that even physicians might not know exactly what the definitions mean. Accordingly, when no definition is provided for a concept—a common situation in the UMLS—the contextual knowledge elements sometimes can suggest one.

The definition of a concept based on the contextual knowledge elements may use the approach of Aristotle in basing the definition of a species on the genus and differentiae. The parent may provide the genus knowledge, while the differences (differentiae) may exist between the siblings. Thus, many definitions that are currently contained in the UMLS may be constructed around the expression of an explicit or implicit IS-A relationship. For example, the NCIT definition of Gut Epithelium, "The epithelium that lines the intestinal tract," follows the Aristotelian definition pattern, because Epithelium is one of the parents of Gut Epithelium.

Knowledge elements, both textual and contextual ones, may be used to correctly determine a meaning for a concept when auditing the concept. Accordingly, including contextual knowledge elements in a neighborhood of a focus concept may facilitate this process.

The immediate neighborhood of the focus concept may be illustrated herein by showing the META as a graph structure, with the parents and children being important contextual knowledge elements. The immediate neighborhood of a focus concept may include the focus concept and all the contextual knowledge elements that are connected to the focus concept by a single relationship (whether hierarchical or lateral). That is, the immediate neighborhood of a concept may contain all concepts at a distance of one level of indirection. The phrase "one level of indirection" may include closely related concepts such as parents, children, and concepts that are the targets of lateral relationships that emanate from the focus concept.

Returning to FIG. 1, an example immediate neighborhood of the concept Microsporidia, Unclassified is illustrated. There may be a practical problem when looking at concept neighborhoods. For many concepts, there are several parents and many children. Diagrams of these parents and children may often show them scattered and intermingled with other unrelated concepts. In such cases, it may become difficult for an auditor to visually construct the neighborhood for a given focus concept.

To help overcome this difficulty, logical associations may be used to group children closely together and parents closely together, while also keeping the parents apart from the children. FIG. 1 illustrates the close relationships by surrounding children with a box (such as children 130), surrounding lateral targets with a box (such as relationships' targets 140), and surrounding parents by another box (which in the example, parents 120 shows only one parent exists).

Viewing the parents, children, and relationship targets of a focus concept is helpful for providing a better understanding of a present focus concept, but may still not be sufficient to reveal the origin and effect of an inconsistency in the META. Thus, after studying such an immediate neighborhood, an auditor might choose to view the extended neighborhood of the focus concept.

Advanced neighborhoods may include both extended neighborhoods and semantic neighborhoods. The extended neighborhood of a focus concept contains a focus concept, contains contextual knowledge elements of the immediate neighborhood, and contains contextual knowledge elements that are separated from the focus concept by a distance of two hierarchical relationships (for example, the distance of two focus-siblings relationships may be obtained by a first hierarchical relationship that can be the focus-to-parent relationship and a second hierarchical relationship that can be the parent-to-child relationship). Thus, the extended neighborhood of a focus concept also contains grandparents, grandchildren, and siblings, which are the other children of the concept's parents. Referring again to FIG. 2, the example of the extended neighborhood of Microsporidia, Unclassified is illustrated.

Looking initially at the extended neighborhood for many concepts might at first seem to be overwhelming for an auditor, but after having reviewed the immediate neighborhood, it may be easier to review concepts one additional level up and one additional level down. The previously mentioned difficulties of constructing the environment visually may be even more complicated, as at least five levels may be involved. The extended neighborhood of Microsporidia, Unclassified, for example, may contain too many children, relationship targets, and grandchildren to be displayed very clearly. FIG. 2, for example, may show a representation of concepts of the extended neighborhood being grouped (with boxes, with the children being grouped in one box, the grandchildren grouped in another box, and other concepts being similarly arranged). Siblings 212 may likewise grouped in a box and related to the focus concept 110 using a "SIB" (sibling) relationship.

A variety of the extended neighborhood may be the "up-extended" neighborhood. A concept may have more children than parents and many more grandchildren than grandparents. Thus, the extended neighborhood might display too many grandchildren. Displaying too many grandchildren may result in an "information overload" situation, while the grandparents instead might be the main items of interest to an auditor. In such a case, an asymmetric neighborhood with grandparents but without grandchildren (e.g., the up-extended neighborhood) may be used to simplify and clarify the presentation of the information to the auditor.

For example, when reviewing Microsporidia, Unclassified, insight may be gained by mainly looking at the associated grandparents. The grandparents may include both Fungus and Protozoa, which is a "surprising" combination and thus may be considered inconsistent. On the other hand, the grandchildren do not appear to provide any additional insights and thus are a distraction for resolving the present inconsistency. The distraction is compounded by the potentially overwhelming number of the grandchildren.

Another variety of the extended neighborhood may be the "down-extended" neighborhood. If auditing uncovers an inconsistency involving a concept, resolving the inconsistency may require an auditor, to check the children and grandchildren of the concept, to see whether the inconsistency has been propagated downwards. For this operation, the display of grandparents may not be especially helpful (if not being a distraction) to the auditor. Thus, there may sometimes be a need for a down-extended neighborhood, which may be a mirror image to the diagram of the up-extended neighborhood. The diagram may include children and grandchildren concepts, but not grandparent concepts. Due to a potentially large number of grandchildren, there may still be the potential for an information overload for an auditor. As discussed below, the hybrid display of the disclosed NAT may help to alleviate this situation.

In addition to the extended neighborhood views, another advanced neighborhood may be the semantic-type neighborhood. As mentioned above, each concept of the META may be assigned one or more semantic types (ST). The STs may help define a broad category for the concept, specifying whether it is, say, a disease (ST Disease or Syndrome), a finding (an ST Finding), or a kind of cancer (an ST Neoplastic Process). Such high-level knowledge may be very useful in auditing, because it may capture the perception of the UMLS editors about the nature of the specific concept. Inconsistencies may occur as a result of misconceptions about (or different ways of viewing) a concept. Thus, irregularity in the ST assignments of a concept may indicate an ST assignment inconsistency, which may lead the auditor to uncover more inconsistencies in other knowledge elements or other concepts.

One example of an ST irregularity may occur when a concept is assigned two semantic types that are incompatible. Another such example is a pair of a concept and the concept's parent: where the STs assigned to the concept and the concept's parent may be inappropriate for a parent-child configuration.

Figure 3:
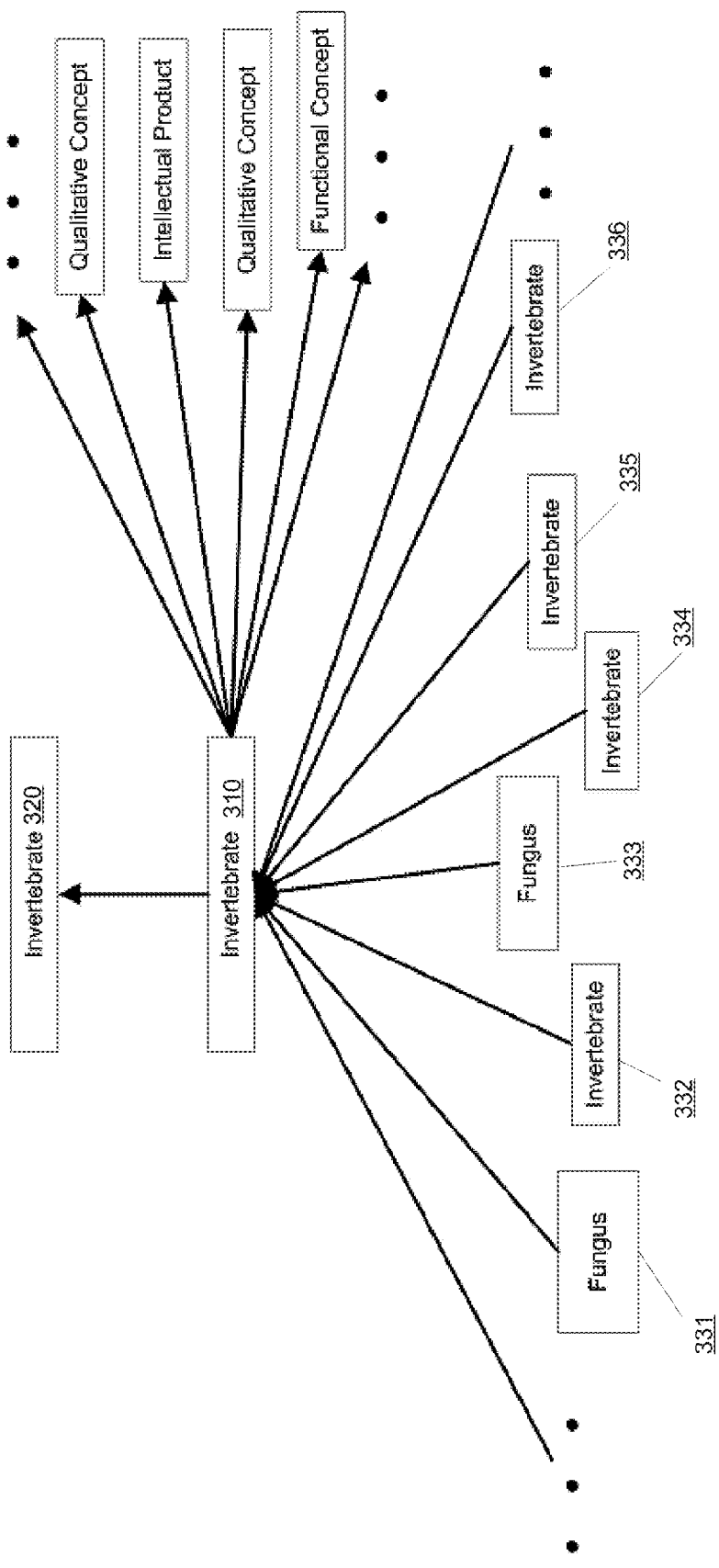
FIG. 3 is a functional block diagram illustrating an example immediate semantic-type neighborhood associated with the focus concept introduced in conjunction with FIG. 1.

FIG. 3 is a functional block diagram illustrating an example immediate semantic-type neighborhood associated with the focus concept introduced in conjunction with FIG. 1, in accordance with the present disclosure. For each neighborhood of a concept, there may be a corresponding neighborhood of STs. That is, a graph may exist with the same (or similar) structure as that of a concept neighborhood, but with nodes representing the STs of the concepts rather than the concepts themselves. For example, some irregularities may be seen in the illustrated ST configuration.

In the illustrated example, the semantic type of the focus concept 310 may be "Invertebrate," the semantic type of parent concept 320 may also be "Invertebrate," but a semantic type of children concepts 331 and 333 (each associated with a different organism from the group one of, for example, *Dictyocoela, Fibrillanosema, Myosporidium*, and *Trichotuzetia*) may be "Fungus," while the semantic type of children 332, 334, 335, and 336 (each associated with a different one of, for example, *Edhazardia, Kabatana, Oligosporidium, Visvesvaria*) may be "Invertebrate." However, the two STs "Fungus" and "Invertebrates," which are children of "Organism," are mutually exclusive in the real world and thus cannot be refinements of one another. Accordingly, they do not constitute a valid ST configuration for a parent-child concept configuration. As shown further below, the disclosed NAT may facilitate the process of auditing such inconsistencies.

As illustrated in FIG. 2, the large plurality of children and grandchildren may greatly complicate the generation of a good (easy to read and use) diagrammatic display. The names of concepts written inside of boxes may be relatively long, which may make it difficult (if not impossible with conventional display technologies) to place all grandchildren next to each other at the same vertical level. For concepts with many children, even the children cannot be displayed at the same vertical level in the diagram. Thus, concepts that are at the same logical level may appear at different physical levels, so that all of the associated concepts may be displayed in the available drawing space. When an automatic layout tool is used (which normally is a practical necessity for all but the most trivially small terminologies), the quality of the diagrams may be even lower than for a layout that is arranged by a human.

Another factor that may make both automated layout and visual comprehension of a concept diagram difficult is the possibility of the existence of multiple parents. Even in simple cases, having multiple parents might lead to diagrammatic intersections (e.g., crossings and bridges) of the parent/child arrows that may be intended to show directionality of a parent/child relationship. When many lines intersect, diagrams become hard to read. Furthermore, intersections between lines and boxes should be avoided (for example, to avoid having the auditor mistakenly think that the line intersecting the box is actually associated with the intersected box). When a layout tool does not allow such intersections, the number of constraints on a layout may grow considerably (especially with consideration to conventional displays), and closely related concepts, such as siblings, might appear far from each other, which may increase the auditor's difficulty in comprehending a neighborhood. The difficulties of visually constructing neighborhoods may be repeatedly addressed each time an auditor navigates the META. Thus, diagrams of concepts can often be unwieldy when constrained by the limitations of conventional display technology. Likewise, pure text representations, even as indented lists, can make it difficult to follow a path from a concept's grandchildren to its grandparents (as well as in the opposite direction). The existence of multiple parents may make the latter task especially difficult, because in the illustrated indented list, only one parent precedes each child.

Figure 4:
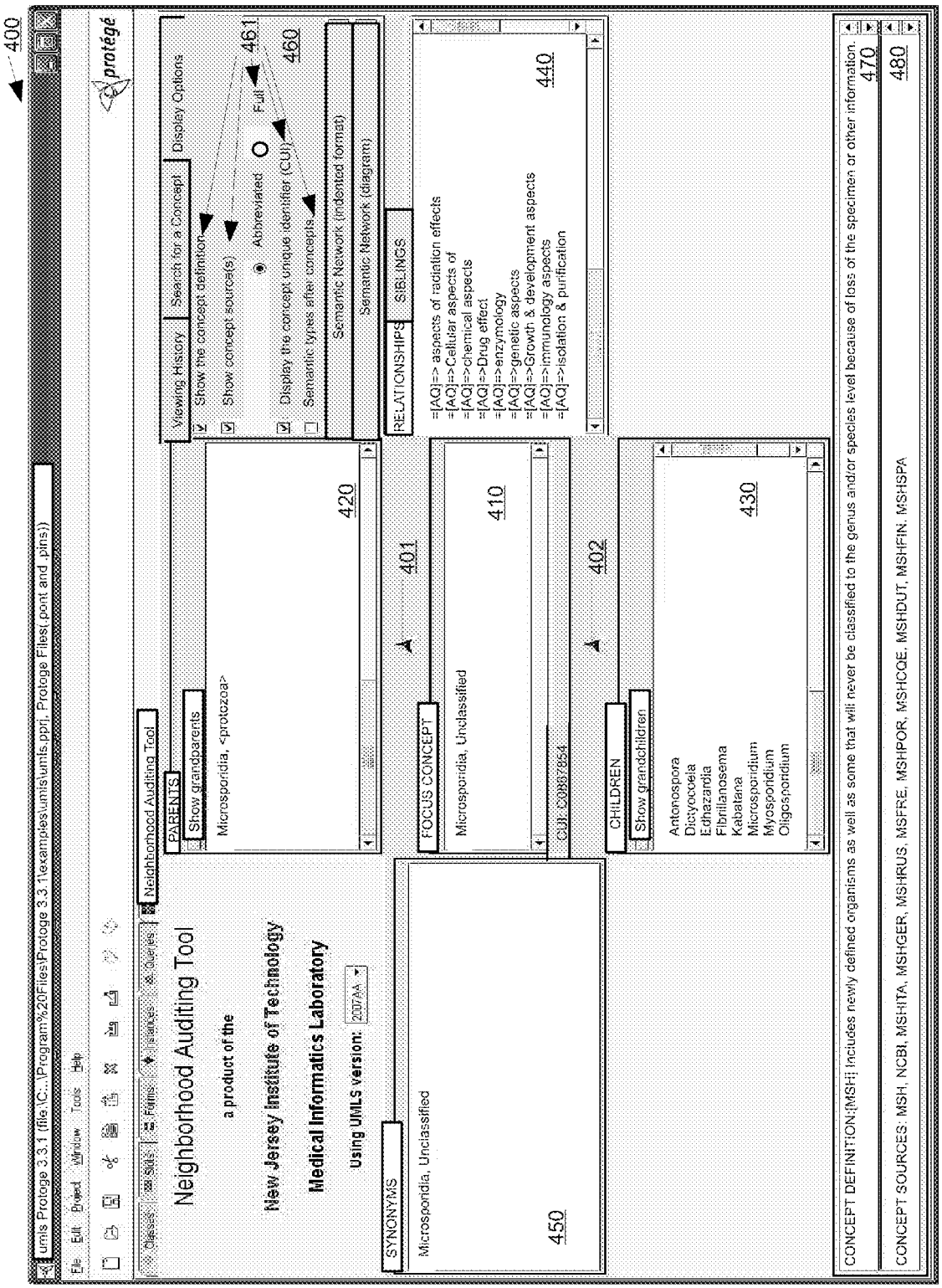
FIG. 4 is an example neighborhood auditing tool user interface image that illustrates the example neighborhood of a focus concept introduced in conjunction with FIG. 1.

FIG. 4 is an example neighborhood auditing tool user interface image that illustrates the example neighborhood of a focus concept introduced in conjunction with FIG. 1, in accordance with the present disclosure. Display 400 includes a focus concept window 410 that may be configured for displaying a presently selected focus concept. A parents window 420 may be located above the focus concept window 410, and may be configured to display the parent concept of the presently selected focus concept. A children window 430 may be located below the focus concept window 410, and may be configured to display the children concepts of the presently selected focus concept. The described physical arrangement of the focus concept window 410, the parents window 420, and the children window 430 may be arranged to mimic the hierarchical (e.g., vertical) logical arrangement of the concepts.

Arrowhead icons 401 and 402 may be arranged to indicate the direction of the displayed hierarchical relationships of parents-to-focus and concept-to-children, respectively. Icons 401 and 402 may thus be oriented in accordance with the relative position of the physical arrangement of the focus concept window 410, the parents window 420, and the children window 430.

A relationships window 440 may be configured to display lateral relationships of the presently selected focus concept and their corresponding target concepts, and may be located to the side of the focus concept window 410. A synonym window 450 may be configured to display synonymous terms of the presently selected focus concept, and also may be located to the side of the focus concept window 410. Thus, the physical arrangement of the focus concept window 410, the parents window 420, and the children window 430 may be arranged to mimic the lateral logical arrangement of the concepts.

A display options window 460 may be configured to provide and/or display one or more controls 461 for the user interface of the display 400. A concept definitions window 470 may be configured to display concept definitions of the presently selected focus concept. A concept sources window 480 may be configured to display the name of source vocabularies of the presently selected focus concept. Accordingly, the windows of display 400 may be arranged, in some examples, to maintain the natural down-position of the children and the up-position of parents relative to the presently selected focus concept as well as to maintain the lateral position of lateral relationships' target concepts. The disclosed alignment may synergistically provide cognitive advantages in understanding the displayed relational information, and may be easier to comprehend than the same relational information by reading text.

The above described physical arrangements of various features of display 400 (and other such displays illustrated herein) are intended as examples and are not to be construed as a requirement. Therefore, other physical arrangements of the various windows, icons, and user selectable controls are contemplated and thus considered within the scope of the present disclosure.

Figure 5:
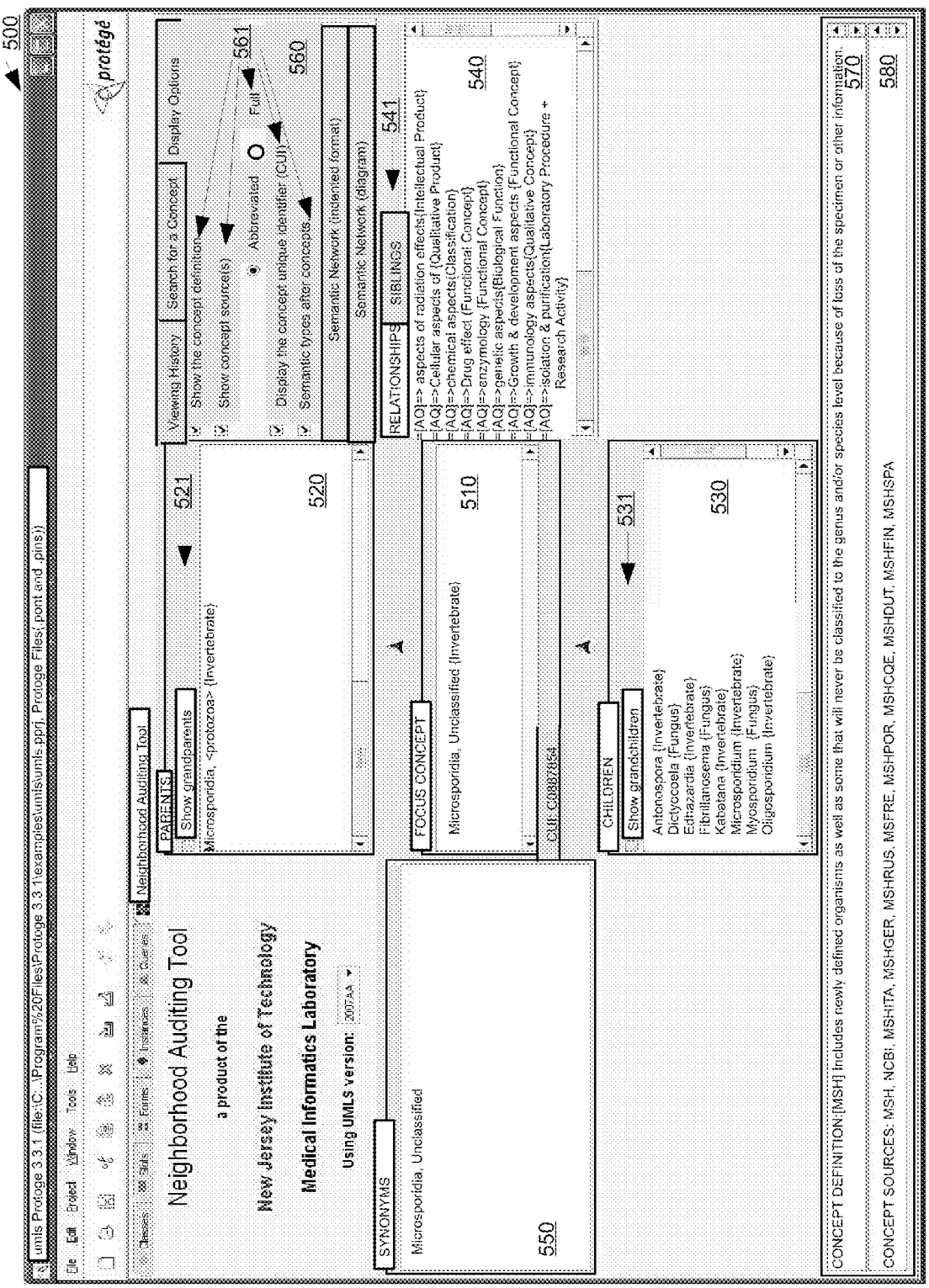
FIG. 5 is an example neighborhood auditing tool user interface image that illustrates semantic types of a focus concept introduced in conjunction with FIG. 4.

FIG. 5 is an example neighborhood auditing tool user interface image that illustrates semantic types of the focus concept introduced in conjunction with FIG. 4, in accordance with the present disclosure. Display 500 includes a focus concept window 510 that may be configured for displaying the presently selected focus concept. A parents window 520 may be located above the focus concept window 510 and may be configured to display the parent concept of the presently selected focus concept. A children window 530 may be located below the focus concept window 510 and may be configured to display the children concepts of the presently selected focus concept. A relationships window 540 may be configured to display lateral relationships of the presently selected focus concept, and may be located to the side of (laterally to) the focus concept window 510. A synonym window 550 may be configured to display lateral relationships of the presently selected focus concept, and also may be located to the side of the focus concept window 510. A display options window 560 may be configured to provide and/or display one or more controls 561 for the user interface of display 500. A concept definitions window 570 may be configured to display a concept definition of the presently selected focus concept. A concept sources window 580 may be configured to display the name of source vocabularies of the presently selected focus concept.

Display 500 generally illustrates the neighborhood of FIG. 4. However, in display 500 semantic types may also be displayed for each concept by integrating the semantic type neighborhood of FIG. 3 into the display 500. Each concept name may be immediately followed by the corresponding semantic type. To make it visually easier to distinguish the semantic types from the concepts, the semantic types may be displayed in a distinct color that is different from any color used for concepts. Furthermore, as there may be more than one semantic type for each concept, the semantic types may be delimited by symbols (e.g., braces) for clarity of viewing when evaluating the semantic types.

The semantic types may be evaluated to determine whether one or more semantic types have been assigned correctly to a concept. The user interface may be configured such that when a cursor is floated over a semantic type, the definition for the selected semantic type may automatically appear as a "tool tip."

Extended neighborhood information may also be displayed by using controls in display 500.

For example, the option to display grandchildren may be user controlled by a user interface such as a check box 531 in window 530. By marking the check box 531 "Show grandchildren," the immediate neighborhood for the currently selected focus concept may be transformed into the down-extended neighborhood.

Likewise, the option to display grandparents may be controlled by a user interface such as a check box 521 in window 520. By marking the check box 521 "Show grandparents," the immediate neighborhood for the currently selected focus concept may be transformed into the up-extended neighborhood Siblings of the currently selected focus concept may be displayed on demand (e.g., a selection by a user of a user interface) in window 540. For ease of viewing and comprehension, siblings may be placed at the same level in display 500 as (e.g., laterally relative to) focus concept 510. Due to the limited lateral screen space, the display of relationships and their targets may be, in some examples, overlaid with the sibling display in window 540. In such examples, a user may switch back and forth between these two choices (i.e., the relationships display and the siblings display) by activating a user interface selection mechanism such as clicking on a tab 541 in window 540. Various user interface selection mechanisms may also include radio buttons, selecting or hovering a cursor over a user interface icon, and the like.

In some examples, the sizes of the windows may be automatically adjusted according to the type of neighborhood view that is currently selected. For example, the size of the parent window 520 may be automatically reduced when displaying a down-extended neighborhood. Reducing the size of parent window 520 may allow more area on display 500 so that the children window 530 may be made larger to accommodate displaying a longer list of children.

Figure 6:
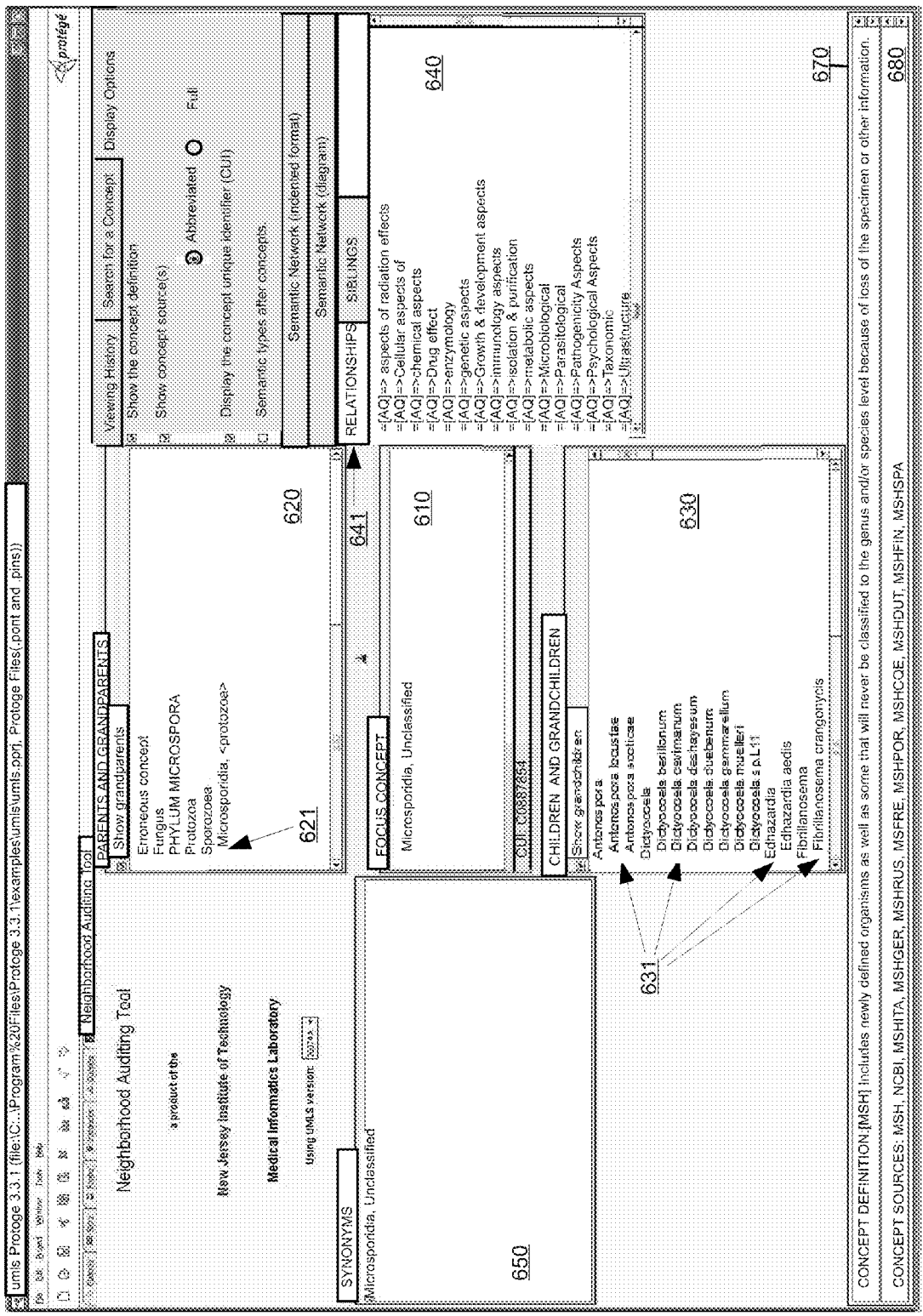
FIG. 6 is an example neighborhood auditing tool user interface image that illustrates an extended neighborhood of the focus concept introduced in conjunction with FIG. 4.

FIG. 6 is an example neighborhood auditing tool user interface image that illustrates an extended neighborhood of the focus concept introduced in conjunction with FIG. 4, in accordance with the present disclosure. Display 600 includes a focus concept window 610 that can be arranged for displaying the presently selected focus concept. A parents and grandparents window 620 may be located above the focus concept window 610 and arranged to display the parent concept of the presently selected focus concept. A children and grandchildren window 630 may be located below the focus concept window 610 and may be configured to display the children concepts of the presently selected focus concept. A relationships window 640 may be arranged to display lateral relationships of the presently selected focus concept, and may be located to the side of the focus concept window 610. A synonym window 650 may be arranged to display synonymous terms of the presently selected focus concept, and may also be located to the side of the focus concept window 610. A display options window 660 may be arranged to provide and/or display one or more controls for the user interface of the display 600. A concept definitions window 670 may be arranged to display concept definitions of the presently selected focus concept. A concept sources window 680 may be arranged to display the name of source vocabularies of the presently selected focus concept.

Without a visually distinguishable hierarchy, the associative information for the currently selected focus concept may be lost by having separate boxes for children and grandchildren such as shown in FIG. 2. The associative information may include information such as which of the grandchildren belong to which children, and which of the grandparents belong to which parents.

To address that problem, the extended neighborhood may be displayed using indentation or some other easily identifiable indicator (e.g., color code, symbolic indicator such as a number or letter, etc.). As illustrated in window 630, when grandchildren and/or children are displayed, the hierarchy of each member of the list may be visually distinguished by levels of indentation, and thus the information about which grandchildren belong to which child may be easily identified. As illustrated, the parents to the currently selected focus concept may be indented. Thus, the information about which parents belong to which grandparent may again be easily (e.g., visually) identified.

Display 600 illustrates the extended neighborhood of the example focus concept Microsporidia, Unclassified, which corresponds to the extended neighborhood shown in FIG. 2. Display 600 may be used to more clearly convey the information shown in FIG. 2. Additionally, display 600 may maintain hierarchical associations between pairs of related concepts across levels of the hierarchy. Display 600 may employ a scrollable window (such as children and grandchildren window 630) to display the concepts that are one and two levels hierarchically removed from the currently selected focus concept. Each level of hierarchy may be represented using a respective level of indentation or some other easily identifiable indicator of level (e.g., color code, symbolic indicator such as a number for the level, etc.). For example, the relationship between a parent and grandparent may be shown by using indentations 621 that indicate the level of the relationship relative to the currently selected focus concept. Similarly, children and grandchildren for a currently selected focus concept may be displayed in a scrollable children and grandchildren window 630 formatted with indentations 631. The indentations 631 may show which grandchild belongs to which child, when both such generations are displayed, or with only children displayed. Information that is associated with other related concepts (by lateral relationships' target concepts), siblings, and synonyms may also be shown using one or more dedicated scrollable text windows such as relationships window 640 and definition window 650.

Thus, the disclosed NAT may employ a hybrid display (e.g., scrollable text windows being physically oriented in accordance with their respective logical dimensions) to provide a large, but easily comprehensible, selection of the desired information. The relative location of windows can be rearranged (such as by putting a children window above and a parent window below a presently selected focus concept) although a user may require some additional training to understand a different arrangement of windows.

In some example embodiments, a window including parents, and optionally grandparents, may be positioned vertically above the focus concept window. The window including children, and optionally grandchildren, may be positioned vertically below the focus concept window. Other relationships may be reachable in the graph diagram by lateral (e.g., horizontal "close-to" and sibling) links. Thus, each of the windows having such lateral relationships is located to the side (e.g., laterally positioned) of the focus concept window. Similarly, siblings and synonyms may appear to the side of the focus concept window. (The type of lateral relationships to be viewed may be selected using tab 641, for example.) However, differently than in a diagrammatic display, the described embodiments may not contain any connecting lines between windows. Thus, the described display may avoid the considerable problems of graphical overlap and of a large numbers of intersections of many lines (which can be difficult or even impossible to review for sight-impaired users).

Figure 7:
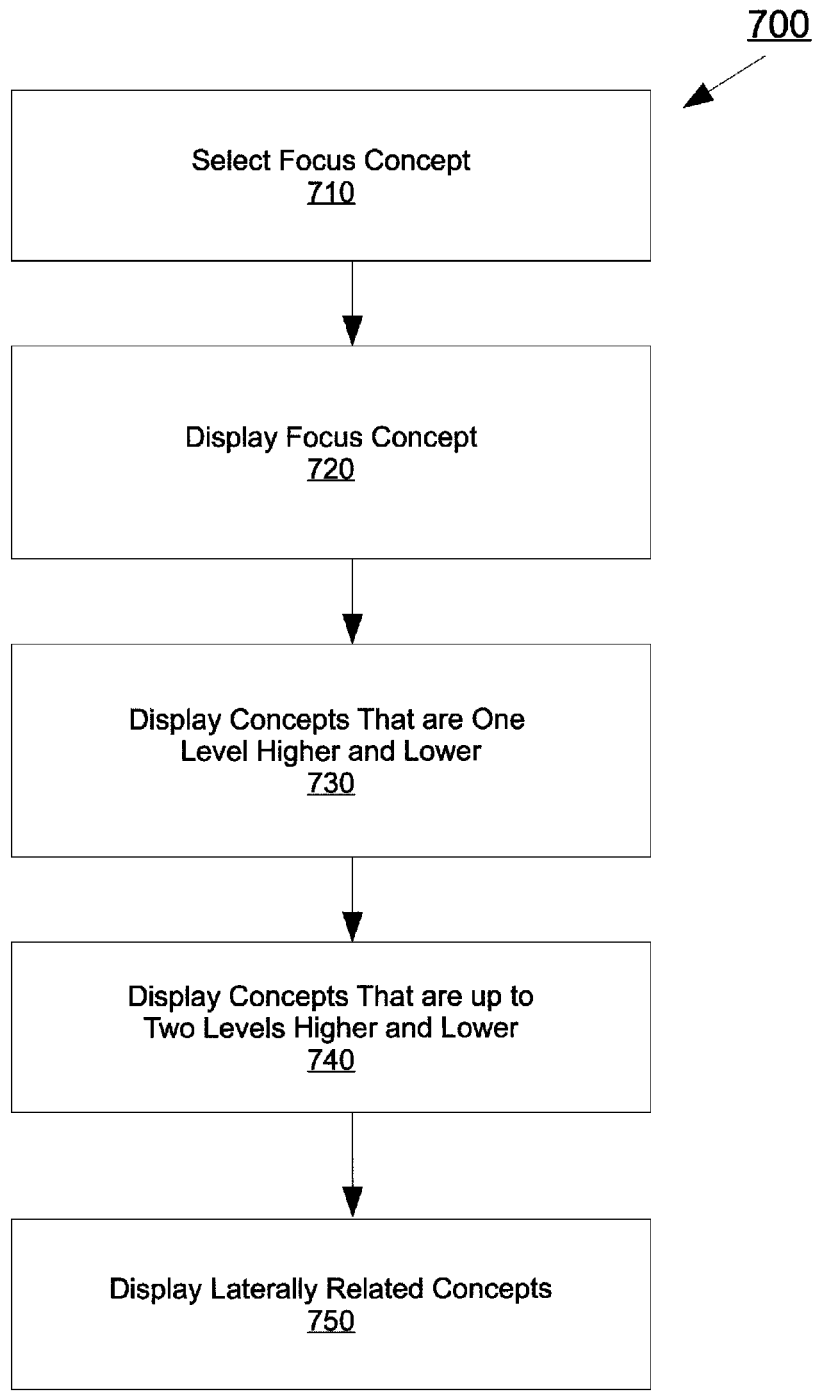
FIG. 7 is an operational flow diagram generally illustrating a process for displaying neighborhood concepts of a selected focus concept in an ontology.

FIG. 7 is an operational flow diagram generally illustrating a process for displaying neighborhood concepts of a selected focus concept in an ontology, in accordance with the present disclosure. The process includes one or more of operations 710, 720, 730, 740 and 750.

At operation 710 a focus concept may be selected such as via a user interface. In some examples, the process (700) may select an initial focus concept by a default setting. In other examples, the process may select an initial focus concept by prompting a user for input. After the initial focus concept is selected, subsequent selection of a new focus concept may be made either by a direct user input, or by a relative user input. For example, a new focus concept that is one level of hierarchy higher or lower from the previously selected focus concept may be selected. Processing may continue from operation 710 to operation 720.

At operation 720 the currently selected focus concept may be displayed in a first window. When no focus concept has been selected at operation 710, the focus concept may be a default concept or visually indicated as blank (e.g., a blank entry, a color coded entry indicating a blank entry, a text indicator prompting a user for entry, etc.). When a focus concept has been selected at operation 710 then the currently selected focus concept may be visually displayed (e.g., textually, symbolically, graphically, etc.) in the first window. The first window may be located in the center region of a displayed image, wherein the displayed image may also be used to display windows for neighborhood concepts as previously described. Processing may continue from operation 720 to operation 730.

At operation 730, the concepts that are one level of hierarchy higher than the currently selected focus concept may be displayed in a second window. The second window may be a scrollable window for displaying indicators (e.g., text, symbols, graphical icons, etc.) of the parent concepts. Similarly, the concepts that are one level of hierarchy lower than the currently selected focus concept may be displayed in a third window. The third window may be a scrollable window for displaying indicators (e.g., text, symbols, graphical icons, etc.) of the children concepts. Processing may continue from operation 730 to operation 740.

At operation 740, concepts that are up to two levels of hierarchy higher than the currently selected focus concept may be displayed in the second window. The hierarchical level(s) associated with each displayed higher level concept may be identified on the display by easily identifiable indicators (e.g., indented text, color coding, symbolic indicators, etc.). A user control of the user interface may be employed to select the level of hierarchies displayed. Thus, grandparent concepts may be displayed in the same window as the parent concepts of the currently selected focus concept.

Similarly, and optionally (e.g., based on user selected options) concepts that are multiple up to two levels of hierarchy lower than the currently selected focus concept may be displayed in the second window. The hierarchical level(s) associated with each displayed higher level concept may be identified on the display by easily identifiable indicators (e.g., indented text, color coding, symbolic indicators, etc.). A user control of the user interface may be employed to select the level of hierarchies displayed. Thus, grandchildren concepts may be displayed in the same window as the child concepts of the currently selected focus concept. Processing may continue from operation 740 to operation 750.

At operation 750, one or more concepts that are laterally associated with the currently selected focus concept may be displayed in a fourth window. The fourth window may be used to display indicators (e.g., text, symbols, graphical icons, etc.) of sibling concepts relative to the currently selected focus concept.

The first, second, third, and fourth windows of the above described example operations may be concurrently visible in the display image on the display. The windows may be positioned in the display image according to a logical context relative to the first window (the focus concept window). For example, the second and third windows may be positioned along a vertical axis that intersects the first window, while the first and fourth windows may be positioned along a horizontal axis. The described example arrangement illustrates that the lateral relationship between the first window (the focus concept window) and the other windows may be displayed along a horizontal axis that intersects the first window. A first icon (such as arrowhead icon 401), displays a hierarchical direction of the first window with respect to the second window, and a second icon (such as arrowhead icon 402) may be employed to display a hierarchical direction of the third window with respect to the first window. The first and second icons may be visual symbols such as graphical icons or text that may be used to convey a direction.

User controls in the user interface may be employed to select the type of lateral relationships for concepts to be displayed in the third window. For example, selecting a control (e.g., via a user interaction, default setting, automated interaction, etc.) may cause semantic types that are related to the displayed concepts to be concurrently displayed in the same window used to display each related concept. Also, controls can be arranged for selectively displaying the list of source vocabularies from which the currently selected focus concept is derived. The concepts of the ontology can be derived from multiple source vocabularies, so it is often helpful to the auditor to know, for example, which organization defined a particular term related to the currently selected focus concept.

Figure 8:
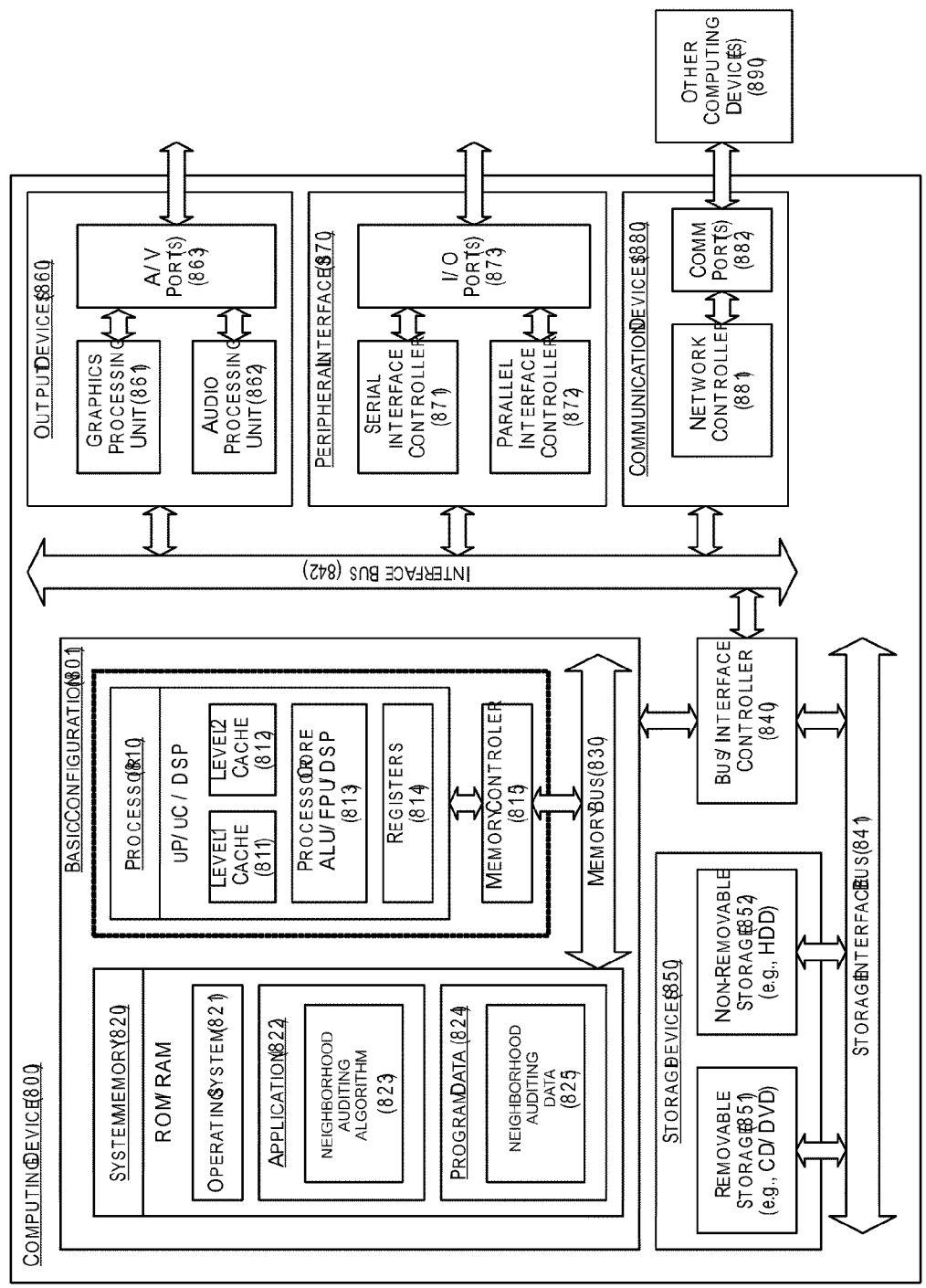
FIG. 8 is a block diagram illustrating an example computing device that is arranged for neighborhood auditing in accordance with the present disclosure.

FIG. 8 is a block diagram illustrating an example computing device 800 that is arranged for neighborhood auditing in accordance with the present disclosure. In a very basic configuration 801, computing device 800 typically includes one or more processors 810 and system memory 820. A memory bus 830 can be used for communicating between the processor 810 and the system memory 820.

Depending on the desired configuration, processor 810 can be of any type including but not limited to a microprocessor (µP), a microcontroller (µC), a digital signal processor (DSP), or any combination thereof. Processor 810 can include one more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 typically includes an operating system 821, one or more applications 822, and program data 824. Application 822 may include a neighborhood auditing algorithm 823 that may be arranged to facilitate auditing concepts in an ontology source vocabularies. Program Data 824 may include neighborhood auditing data 825 that may be useful for neighborhood auditing navigation as has been further described above. In some embodiments, application 822 can be arranged to operate with program data 824 on an operating system 821 such that neighborhood auditing may be facilitated on general purpose computers. This described basic configuration is illustrated in FIG. 8 by those components within line 801.

Computing device 800 can have additional features or functionality, and additional interfaces to facilitate communications between the basic configuration 801 and any required devices and interfaces. For example, a bus/interface controller 840 can be used to facilitate communications between the basic configuration 801 and one or more data storage devices 850 via a storage interface bus 841. The data storage devices 850 can be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media (or computer-readable medium) includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include an interface bus 842 for facilitating communication from various interface devices (e.g., output interfaces, peripheral interfaces, and communication interfaces) to the basic configuration 801 via the bus/interface controller 840. Example output devices 860 include a graphics processing unit 861 and an audio processing unit 862, which can be configured to communicate to various external devices such as a display or speakers via one or more A/V ports 863. Example peripheral interfaces 870 include a serial interface controller 871 or a parallel interface controller 872, which can be configured to communicate with external devices such as input devices (e.g., keyboard, mouse, pen, voice input device, touch input device, etc.) or other peripheral devices (e.g., printer, scanner, etc.) via one or more I/O ports 873. An example communication device 880 includes a network controller 881, which can be arranged to facilitate communications with one or more other computing devices 890 over a network communication via one or more communication ports 882. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

FIG. 9 is a diagram generally illustrating a computer product configured to perform processing for the neighborhood auditing system shown in FIG. 1, in accordance with the present disclosure. The computer program product 900 may take one of several forms, such as a computer-readable medium 902 having computer-executable instructions 904, a recordable medium 906, a communications medium 908, or the like. When the computer-executable instructions 904 are executed, a method is performed. The instructions 904 include, among others, selecting a focus concept in the ontology as a currently selected focus concept; identifying one or more concepts in the ontology that are at least one level of hierarchy higher than the currently selected focus concept as higher concepts, at least one level of hierarchy lower than the currently selected focus concept as lower concepts, or laterally associated with the currently selected focus concept as lateral relationships' target concepts; defining a first window region, a second window region, a third window region, and a fourth window region of the display image; generating content in the first defined window region to include the currently selected focus concept; selectively generating content in the second defined window region for lower concepts when identified; selectively generating content in the third defined window region for higher concepts when identified; selectively generating content the fourth defined window region for lateral relationships' target concepts when identified; and rendering the display image such that the first, second, third, and fourth defined window regions are concurrently rendered in the display image.

As will be appreciated by those persons skilled in the art, the system and method described herein affords distinct advantages not previously available to auditors of ontologies. The present system and method allows users to, for example, efficiently audit and/or navigate concepts of an ontology. Neighborhood concepts for a selected focus concept may be automatically displayed in a hybrid display that efficiently uses display area. The hybrid display may use scrollable window regions for displaying lateral and hierarchical information for single or multiple generations of concepts (such as parent and grandparent concepts) in a single window. The windows in the hybrid display may be in a logical arrangement so that neighborhood information about concepts may be generally presented in an easy-to-comprehend format. The efficient, easily accessed contextual information thus helps to ease the task of an auditor by easing the tasks of searching contextual information needed for auditing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art. The various embodiments disclosed herein are for purposes of illustration and are not intended to be limiting, with the true scope and spirit being indicated by the following claims.

What is claimed is:

1. A computer-implemented method to generate a display image to audit an ontology, the method comprising:
   selecting a concept in the ontology with the computer device to provide a currently selected focus concept;
   formatting in a first window region of the display image the currently selected focus concept;
   formatting in a second window region of the display image first ontological concepts consisting of parent concepts that are one level of hierarchy higher than the currently selected focus concept in the ontology, and wherein the second window region is located above the first window region and includes the first ontological concepts in a first scrollable text window;
   formatting in a third window region of the display image second ontological concepts consisting of child concepts that are one level of hierarchy lower than the currently selected focus concept in the ontology, and wherein the third window region is located below the first window region and includes the second ontological concepts in a second scrollable text window; and
   formatting in a fourth window region of the display image multiple lateral relationships' target concepts, wherein the lateral relationships' target concepts are laterally associated via a lateral relationship with the currently selected focus concept in the ontology, wherein the fourth window region is along a horizontal axis of the first window region and includes the lateral relationships' target concepts in a third scrollable text window, and wherein the first, second, third, and fourth window regions are distinct from one another and formatted for concurrent viewing.

2. The method of claim 1, further comprising formatting in the second window region multiple secondary higher concepts that are two levels of hierarchy higher than the currently selected focus concept.

3. The method of claim 1, further comprising formatting in the third window region multiple secondary lower concepts that are two levels of hierarchy lower than the currently selected focus concept.

4. The method of claim 1, further comprising:
   receiving notice of a selection of a concept that is either one or two levels of hierarchy higher or lower from the currently selected focus concept or a lateral relationships' target concept for identification as a newly selected focus concept;
making the concept identified in the notice the currently selected focus concept; and
repeating the formatting of the first, second third and fourth windows based on the newly selected focus concept as the currently selected focus concept.

5. The method of claim 1, further comprising formatting the third window region of the display to indicate differences in hierarchical levels between the concepts which are one level lower, and the concepts which are two levels lower than the currently selected focus concept while indicating which concepts are two levels lower, and which concepts are one level lower than the currently selected focus concept.

6. The method of claim 1, further comprising formatting the second window region of the display to indicate differences in hierarchical levels between the concepts which are one level higher and the concepts which are two levels higher than the currently selected focus concept while indicating which concepts are two levels higher and which concepts are one level higher than the currently selected focus concept.

7. The method of claim 1, further comprising adjusting a hierarchical level control, wherein the hierarchical level control is arranged to selectively include or exclude one or more lower concepts that are two levels of hierarchy lower than the currently selected focus concept from the third window region of the display image.

8. The method of claim 1, further comprising adjusting a hierarchical level control, wherein the hierarchical level is arranged to selectively include or exclude one or more higher concepts that are two levels of hierarchy higher than the currently selected focus concept from the second window region of the display image.

9. The method of claim 1, wherein the fourth window region arranged to display siblings of the currently selected focus concept.

10. The method of claim 1, further comprising generating a first icon in the display image, wherein the first icon is arranged to identify a hierarchical direction of the first window region with respect to the second window region of the display image.

11. The method of claim 1, further comprising generating a second icon in the display image, wherein the second icon is arranged to identify a hierarchical direction of the third window region with respect to the first window region.

12. The method of claim 1, further comprising arranging the second and third window regions along a vertical axis in the display image that intersects the first window region.

13. The method of claim 12, further comprising arranging the fourth window region along a horizontal axis in the display image that intersects the first window region.

14. The method of claim 1, further comprising generating semantic types that are related to the concepts in one of the first, second, third and fourth regions, and concurrently presenting the generated semantic types in the same window region as the related concepts.

15. The method of claim 1, wherein the selected focus concept of the ontology is derived from multiple source vocabularies.

16. The method of claim 15, further comprising formatting in a fifth window region a scrollable text window that includes a list of source vocabularies from which the selected focus concept is derived.

17. The method of claim 1, further comprising formatting in a sixth window region a scrollable text window that includes a definition of the focus concept.

18. An apparatus effective to generate a display image to audit one or more concepts in an ontology, the apparatus comprising:
a computer-readable storage medium arranged to store computer-readable instructions; and
a processor that is configured by the computer-readable instructions from the computer-readable storage medium to:
select a concept in the ontology as a currently selected focus concept;
identify first ontological concepts consisting of parent concepts in the ontology that are one level of hierarchy higher than the currently selected focus concept as higher concepts;
identify second ontological concepts consisting of child concepts one level of hierarchy lower than the currently selected focus concept as lower concepts;
identify multiple concepts laterally associated with the currently selected focus concept as lateral relationships' target concepts;
define a first window region, a second window region located above the first window region with a first scrollable text window, a third window region located below the first window region with a second scrollable text window, and a fourth window region located along a horizontal axis of the first window region with a third scrollable text window of the display image;
generate content in the first defined window region to include the currently selected focus concept;
generate content in the first scrollable text window of the second defined window region for the first ontological concepts in the ontology;
generate content in the second scrollable text window of the third defined window region for the second ontological concepts;
generate content in the third scrollable text window of the fourth defined window region for multiple lateral relationships' target concepts in the ontology; and
render the display image such that the first, second, third, and fourth defined window regions are concurrently rendered distinct from one another in the display image.

19. A computer-readable medium encoded with computer-executable instructions for generating a display image to audit one or more concepts in an ontology, the computer-executable instructions comprising:
selecting a focus concept in the ontology as a currently selected focus concept;
identifying first ontological concepts consisting of parent concepts in the ontology that are one level of hierarchy higher than the currently selected focus concept as higher concepts;
identifying second ontological concepts consisting of child concepts in the ontology that are one level of hierarchy lower than the currently selected focus concept as lower concepts;
identifying multiple concepts in the ontology that are laterally associated with the currently selected focus concept as lateral relationships' target concepts;
defining a first window region, a second window region located above the first window region with a first scrollable text window, a third window region located below the first window region with a second scrollable text window, and a fourth window region located along a horizontal axis of the first window region of the display image with a third scrollable text window;
generating content in the first defined window region to include the currently selected focus concept;

generating content in the first scrollable text window of the second defined window region for the first ontological concepts;
generating content in the second scrollable text window of the third defined window region for the second ontological concepts;
generating content in the third scrollable text window of the fourth defined window region for multiple lateral relationships' target concepts; and
rendering the display image such that the first, second, third, and fourth defined window regions are concurrently rendered distinct from one another in the display image.

* * * * *

UNITED STATES PATENT AND TRADEMARK OFFICE
CERTIFICATE OF CORRECTION

PATENT NO.        : 8,788,974 B2
APPLICATION NO.   : 12/490293
DATED             : July 22, 2014
INVENTOR(S)       : Perl et al.

It is certified that error appears in the above-identified patent and that said Letters Patent is hereby corrected as shown below:

In the Claims

In Column 19, Line 6, in Claim 4, delete "second third" and insert -- second, third --, therefor.

In Column 19, Line 26, in Claim 7, delete "are two" and insert -- are --, therefor.

In Column 19, Line 36, in Claim 9, delete "arranged" and insert -- is arranged --, therefor.

Signed and Sealed this
Twenty-fifth Day of November, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,788,974 B2 | Page 1 of 1 |
| APPLICATION NO. | : 12/490293 | |
| DATED | : July 22, 2014 | |
| INVENTOR(S) | : Perl et al. | |

It is certified that error appears in the above-identified patent and that said Letters Patent is hereby corrected as shown below:

In the specification

In Column 1, Line 11, insert -- STATEMENT REGARDING FEDERALLY SPONSORED RESEARCH OR DEVELOPMENT
This invention was made with government support under grant LM008445 awarded by the National Institutes of Health. The government has certain rights in the invention. --.

Signed and Sealed this
Twenty-fourth Day of November, 2015

Michelle K. Lee
*Director of the United States Patent and Trademark Office*